United States Patent

Worner

Patent Number: 5,531,805
Date of Patent: Jul. 2, 1996

[54] SMELTING FERROUS MATERIALS

[75] Inventor: Howard K. Worner, Wollongong, Australia

[73] Assignee: The Illawarra Technology Corporation Limited, New South Wales, Australia

[21] Appl. No.: 317,857

[22] Filed: Oct. 4, 1994

Related U.S. Application Data

[63] Continuation-in-part of Ser. No. 916,983, Aug. 13, 1992, Pat. No. 5,364,441.

[30] Foreign Application Priority Data

Feb. 13, 1990 [AU] Australia .................................. PJ8617
May 9, 1994 [AU] Australia .................................. PM7925

[51] Int. Cl.$^6$ .................................................. C21B 11/10
[52] U.S. Cl. ........................... 75/10.63; 75/961; 423/107
[58] Field of Search .................................. 75/10.1, 10.63, 75/416, 430, 961; 423/107

[56] References Cited

U.S. PATENT DOCUMENTS 4,758,268  7/1988  Bishop et al. ............................ 75/958
4,793,855  12/1988  Hauk ........................................ 75/560
5,364,441  11/1994  Worner ..................................... 75/10.1

Primary Examiner—Melvyn Andrews
Attorney, Agent, or Firm—Hawes & Fischer

[57] ABSTRACT

Finely divided ferruginous material is intimately mixed with finely divided carbonaceous material and agglomerated and formed into pellets typically of a few cubic centimeters volume to form a feedstock for a smelting operation. The carbonaceous material includes carbon in both high reactivity and low reactivity forms typically provided respectively by sewage sludge or other biosolids and by coke fines, kish graphite, natural graphite, lignite or brown coal. Smelting is conducted in a bath smelting furnace with the bath temperature of at least 1420° C. and preferably 1500° C. in a manner controlled to destroy any organic compounds present, to use carbon as a source of fuel, to carburise the iron to around 4% carbon or higher and to provide an off-gas which can be processed to collect any volatilized metal values.

19 Claims, 3 Drawing Sheets

SMELTING FERROUS MATERIALS

RELATED APPLICATION

This application is a continuation-in-part of application Ser. No. 07/916,983 filed Aug. 13, 1992.

FIELD OF THE INVENTION

The present invention relates to the treatment of wastes and is more particularly concerned with treatments which are environmentally beneficial and efficient.

BACKGROUND TO THE INVENTION

In this specification, some embodiments of the invention will be described in terms of a process using fine particulate wastes containing iron values and which are generally referred to as steelworks dusts. In modern steelmaking such ferruginous dusts are produced particularly during oxygen steelmaking and electric steelmaking, the dust frequently containing significant zinc values. In some steel making plants, a wet process is used for removing the waste and the steelworks dusts are in the form of a sludge, but in this specification the term "steelworks dusts" will be used to cover the fine wastes from steelworks whether in dust form or sludge form. However, it is to be understood that the invention is not necessarily limited just to the processing of such steelworks dusts and analogous applications may exist. Other materials which may be used are ore, steel and iron scrap (which is finely divided to become a feedstock) and other ferrous particulates.

Generally steelworks are located in areas having substantial populations in the vicinity and accordingly having a major problem in dealing with sewage sludges, the disposal of which is often environmentally harmful. Sewage sludges may contain pathogens as well as harmful chemicals in small quantity, such as heavy metals and chlorinated and fluorinated hydrocarbons.

There is also a widespread problem in modern steelworks in dealing with the steelwork dusts. These dusts contain zinc oxide and spinels which result in the dust being unsuitable for return to sinter plants and from there back to blast furnaces since the zinc content creates problems to upper refractories in the shaft of a blast furnace. A large proportion of modern steelworks dusts are micron-sized particles mainly of iron and iron oxides in which the whole range of valencies of iron are represented. Furthermore the dusts usually contain a variety of calcium-containing compounds, zinc-containing compounds and carbon-containing compounds.

Thus, in many industrial areas around the world, there is a major problem of waste from ferrous metals industry, waste from sewage sludge and other carbon wastes (such as weed, paper waste and other sources), all of which present longstanding economic disposal problems. Land fill has become unavailable or very expensive and is often environmentally unacceptable, especially when the wastes, are contaminated.

Examples of prior published proposals are:
AUA 50854/73—Calspan Corporation
AUB 403623—Conzinc Riotinto of Australia Limited
AUB 403167—(equivalent U.S. Pat. No. 3,664,828) Conzinc Riotinto of Australia Limited
AUB 404433—Worner
JP 55-49200—Nippon Process Engineering KK
U.S. Pat. No. 4,004,918—Fukuoka
JP 58-156399—OTAT
DE 3148550—Hamberger Stahlwerke GmbH
JP 01-11700—Mitsubishi Mining & Cement Co Ltd
U.S. Pat. No. 4,711,727—Matthews et al
U.S. Pat. No. 4,793,855—Hauk
U.S. Pat. No. 3,262,771—Ban
U.S. Pat. No. 3,770,419—Brown
U.S. Pat. No. 4,758,268—Bishop et al

SUMMARY OF THE INVENTION

When applied to the treatment of sewage and steelworks dust, the invention is based on the concept of mixing the dusts with sewage, extracting solids and processing the solids in a smelting operation to produce molten iron and a hot gas discharge, the sewage solids including carbon compounds which are a source of carbon in the smelting process for reduction of the iron compounds in the dust and also provide a source of fuel for the smelting operation. However, forms of the invention extend to the treatment of other feedstock materials including brown coal or lignite which may be used in smelting processes embodying the invention notwithstanding its high water content and relatively low grade character making it unsuitable for conventional iron production methods.

In one aspect, the invention provides a method of smelting comprising intimately mixing ferrous material in particulate form with carbonaceous material in particulate form, forming a pelletised feedstock for a bath smelting furnace from an agglomeration of the ferrous material and carbonaceous material, supplying the feedstock to the bath smelting furnace and operating the furnace to maintain an iron bath temperature of at least about 1420° C. and to use the carbonaceous material to reduce iron compounds in the feedstock, to provide a source of fuel for maintaining the selected elevated temperature in the furnace and to carburise molten iron in the bath, and processing of gases from the reduction furnace to retrieve any metal values in the off-gas.

In this specification the term "pelletised" is used broadly to refer to any form of process which produces a composite from fine agglomerated particulate material. Typically the pellets will be of a few cubic centimeters of volume and may be achieved by such techniques as extrusion or briquetting.

Preferred embodiments of the invention include high reactivity carbonaceous material as well as a low reactivity form. This is especially beneficial when a bath smelting furnace of the type described below with reference to the drawings is utilised. The high reactivity form can be derived from sewage sludge or similar biosolids where the carbonaceous material is of soft finely divided form and burns very vigorously on introduction to the furnace thereby providing high heat values which provide vigour in the process. By contrast, low reactivity forms of carbon such as kish graphite or coke fines are a harder rock-like substance and react more slowly whereby the desired carburising of the iron can occur. The economics of the present process, particularly when wastes are being utilised in the feedstock, depends to a significant extent on producing a predictable high quality grade of iron which will have commercial value. Typically this must have 4% or more of carbon. By utilisation of a biosolid such as sewage sludge for part of the carbonaceous material, advantage can be taken of its inherent characteristics of agglomerating with fine ferrous particles such as steelworks dust. Such sewage sludge aids the formation of agglomerates.

In another aspect the present invention may be defined as consisting in a method of producing a cast iron (which before discharge from the furnace is known in the art as "Hot Metal"), which typically comprises around 3%–4% carbon (and more generally comprises 2%–5% carbon). The method comprises taking particulate ferruginous and carbonaceous materials formed into an intimate solid mixture in agglomerated form and conducting a bath smelting operation in a furnace to produce cast iron, the method being characterised by (a) incorporating in the agglomerates carbonaceous material in suitable forms to provide a significant proportion of relatively low reactivity carbon and a significant proportion of high reactivity carbon, the carbonaceous material being principally other than sewage sludge and the agglomerates optionally including or excluding other components such as contaminants, organic material, non-ferrous metallic components and (b) feeding the agglomerates into the furnace in a controlled manner whereby adequate carburising of the molten iron occurs from some of the carbonaceous material and other carbonaceous material burns as a fuel to maintain required high temperature processing conditions such that any organic compounds are destroyed and any other metal values are discharged through a flue and can be collected in a collection system.

It is believed that there is significant advantage in recognising that a blend of carbonaceous materials is one which ensures appropriate degree of rapid reaction for initiating reduction of oxidic materials while having a portion of the carbon in a low reactivity form to ensure adequate take-up of carbon in the cast iron.

It is believed that particularly useful embodiments of the invention are those where at least part of the carbonaceous material is a biosolid other than sewage sludge and generally such solids are useful in facilitating agglomeration especially in preferred embodiments where pressure is applied e.g. by briquetting or extruding. Such techniques permit efficient and safe handling of agglomerates by the production of relatively large particles which nevertheless can be conveyed and flow readily without disadvantageous dusting and on insertion of such agglomerates into the furnace there is avoidance of explosive burning of components. This avoids undesirable discharge of components with the off-gas.

Typically the ferruginous material is of particle size below 2 mm and the carbonaceous material is one or two orders of magnitude smaller. The method preferably includes using carbonaceous material which has a degree of binding effect to facilitate the formation of aggregates and the intimate mixture of the carbonaceous material and the ferruginous material.

In accordance with established convention, the classification of carbonaceous materials as referred to in this specification is based on a standard test in which a sample of the material is heated in a small crucible for a certain length of time at a selected elevated temperature and a stream of carbon dioxide is passed over the sample. After the predetermined time the percentage weight loss by the sample is determined as a measure of reactivity. A weight loss of the order of 5%–10% is considered typical of a low reactivity sample.

A useful application of the invention is to embodiments in which the ferruginous material includes iron ore and the carbonaceous material may include lignite or brown coal which conventionally would not be suitable for use as a fuel in the production of cast iron.

Embodiments of the invention can incorporate numerous sources of starting materials and the invention is especially beneficial due to utilisation of scrap, waste or contaminated material. For example oil covered metal swarf can be incorporated as well as millscale and steel scrap which is best chopped into relatively small fragments. However, as is well-known in the ferrous metal industry, it is desirable to minimise the phosphorus and sulphur content in the iron produced. To avoid degradation of quality of the iron or variation in its quality it is best to avoid scrap materials which are tin or copper coated.

Generally the invention is practised by smelting to maintain the hot metal and the process conditions in the range 1400°–1600° C. and around 1500° C. has been found to be generally suitable.

Preferably the proportion of low reactivity carbonaceous material in the mix is at least 5% by weight and generally should be in the range of 10%–50% by weight to ensure adequate carburising of the iron.

The form of furnace used may be chosen among a range of options and is preferable an alternating current or a direct current arc furnace or a pneumatic bath smelting furnace. As described below the applicant prefers to use a counter-current bath smelting furnace of the type described below with reference to the drawings. Preferably this is operated in a continuous mode.

To facilitate the formation of agglomerates which can be briquetted, extruded or pelletised, it is preferable that material having a binding characteristic is incorporated and it has been found that many biosolid carbonaceous materials are suitable. For example ground wood pulp and lake weed may be used.

Feedstock for use in smelting according to the present invention can include solid material derived by using steelworks dust as a settling agent for a sewage stream. This preparatory step uses the relatively high surface area of the fine steelworks dusts and the active chemical nature of the compounds in the dusts has been found to be very beneficial in settling sludge. The compounds advantageously can react with and/or chemically adsorb onto the solid particles in sewage, these particles comprising organic matter, pathogens and heavy metal compounds.

In some embodiments of the invention, it is desirable to add in the mixing step some flocculating agent to enhance the interaction between the steelworks dusts and the solid components of the sewage to form a composite solid material which can be readily separated. Preferably, the flocculating agent is cationic.

Furthermore bactericidal material may be advantageously added to the mixing stage of the process.

Preferably, the sewage undergoes preliminary screening to remove components such as large pieces of plastics material and grit. Steelworks dust is then mixed with the sewage vigorously and it is then preferable to engage in a settling process and dewatering to provide a resultant sludge. It is thought that in many embodiments the use of steelworks dusts facilitates efficient rapid settling of the solids in sewage thereby helping the process to yield cleaned water which might be useable for irrigation or industrial purposes. The settled sludge, because of the ferruginous matter present, will be denser than sludge derived by conventional treatment of the sewage and this extra density facilitates subsequent dewatering processes, for example by centrifuging and belt pressing.

Embodiments of the invention can also use other fine particulate matter such as finely crushed mill scale, fine particulate carbons from coke ovens and fine metal particles. Such materials can be mixed into sewage to increase iron and carbon in the sludge or can be smelted separately.

Most steelworks dusts have sufficient calcium containing material in the dust to provide appropriate flux material for the smelting operation of the present process. Where sewage sludge is to be used, burnt lime or slaked lime can be added at the stage of mixing and sludge formation to provide the required calcium for smelting. However, more importantly it has been found that the lime is effective in reducing the biological oxygen demand (B.O.D.) in the effluent without deleteriously raising the alkalinity of the effluent. In this specification references made to "lime" and this is to be understood as referring to burnt lime or slake lime, mixtures thereof and mixtures incorporating other calcium rich compounds.

Experiments in the settling of solid material from sewage has shown that a wide range of proportions of steelworks dust to lime can be used to achieve high settling rates and a beneficial reduction in the BOD thereby leaving a liquid which may well be considered suitable for discharge for example for irrigation purposes.

Preferably the dewatered sludge is dried e.g. by solar drying if the climate is suitable or by utilisation of hot off-gases in the steelworks, e.g. from the smelting step of the present process. It may be desirable to use odour control techniques during this drying stage.

To facilitate subsequent handling of the solid material, after the drying step at which the moisture content of the sludge is very low, the solid material is extruded and formed into lumps or otherwise formed into a convenient mass such as by briquetting; this step produces "composites" of uniform cross-sectional shape to facilitate handling in subsequent stages.

One example of known technology for drying the solid material can also conveniently provide controlled preheating of the solid material which is advantageous before the material is introduced into the smelting stage. The technology is described in Australian patent specification 15299/88 (and in equivalent U.S. Pat. No. specification 4,906,290) entitled "Microwave Irradiation of Composites" by the present inventor. However it is to be understood that the present invention is not limited to any particular drying or heating technique and generally any suitable drying process can be used.

Frequently sewage contains various oils and the invention can be applied in a method which incorporates a step for removal and collection of oils. The oils are taken up by the solid material and kept with the solid material during the dewatering process. When the composites are produced with appropriate temperature control e.g. in the range 100° C. to 450° C., the oils can be steam-distilled off and collected. Preferably the drying and preheating step applied to the solid material avoids temperatures exceeding about 450° C. since then charring of the carbonaceous material in the composites can become dominant and it is preferred to retain the pyrolytic properties of the components in the composites such that their fuel value is preserved for use in the subsequent smelting stage.

The smelting stage of the present process, when applied to steelworks dusts, produces molten metal, primarily iron, on top of which a slag is formed and hot gases are given off which can be subsequently processed, for example by precipitating zinc oxide which forms in the hot off-gas thereby providing a marketable zinc compound and removing what would otherwise be an unwanted contaminant. The treated gases can then be used for preheating steps in the process or otherwise used in the plant.

Preferably, the smelting step uses a smelt-reduction furnace such as counter-current flow furnace designed by the present inventor. In one form the furnace provides essentially a bath with an inlet for solid feed material at an upper location and one or more lances for introduction of air or oxygen enriched air which have a vigorous stirring action and provide oxygen for reaction with the burning fuel. A slag forms on the surface of the molten iron and separate tapping points are provided respectively for the slag and iron.

The use of the lances provides a turbulence for "splash" effect and heat transfer thereby is relatively efficient from the gas phase back to the slag and molten metal.

An alternative counter-current furnace is one utilising an electric arc between electrodes. Such a furnace would utilise an oxygen lance through which also lime can be introduced and turbulent conditions are established to ensure vigorous dispersal of the solid feed material in the melt.

Yet a further option is to utilise a smelt furnace operating under plasma technology.

Preferably a counter-current furnace used in embodiments of the present invention is generally barrel-shaped and operated such that temperatures in excess of 1500° C. are obtained in the gas phase. Such a temperature is highly beneficial, not only for the smelting process but also to achieve destruction of potentially harmful components of the sewage and in particular chlorinated or fluorinated hydrocarbons and pathogens. It is suggested that this process offers considerable benefits when compared with conventional sewage sludge incineration.

Furthermore, use of the preferred smelt-reduction furnace may be beneficial in fully combusting graphite often found as "KISH" graphite in steelworks dusts.

In preferred embodiments, the process is controlled such that the bath temperature of the melt is in the range 1420° C. to 1500° C. and the gas temperatures above the bath are in the range 1550° C. to 1650° C. These conditions facilitate burning of carbon monoxide which comes out of the solid feed material (composites) and also boils out of the bath. The carbon monoxide is burned within the furnace to produce carbon dioxide thereby achieving good fuel efficiency.

The Process of the present invention is preferably controlled so that the total carbon present in the dried composites is well over the stoichiometric requirements for the chemical reduction of the oxidic iron and zinc in the feedstock. The reasons for this include the following:

(a) The carbon in the composites has a fuel function as well as a chemical reduction function.

(b) The excess carbon provides fuel values which can achieve high gas temperatures to provide the incineration role of the process as well as transferring heat back to the slag and molten metal.

(c) The excess carbon provides fuel to maintain a relatively high bath temperature which facilitates a higher rate of smelting of the composites and absorption of surplus carbon into the metal in the bath.

(d) The excess carbon provides fuel for ensuring high temperatures which cause zinc values to boil rapidly from the molten metal. The zinc leaves the bath as elemental metal and in the gas discharge oxidises to zinc oxide.

Embodiments of the invention may usefully also permit the handling of other waste materials. Carbon-containing waste materials of diverse types might be incorporated into the smelting step. For example iron contaminated dusts, greases, oils and rags might be processed in addition to waste materials such as steel contaminated by plastic materials (which is unsuitable for conventional scrap steel recycling). Furthermore, sources of carbonaceous material for the process can include waste paper, coal fines and other products including organic chemicals which, because of very high temperature combustion, may be utilised and safely processed.

In summary at least some embodiments of the invention can permit the following advantages to be achieved:

Waste steelworks dusts can be processed to recover metal values thereby obviating storage or disposal problems and sewage can be processed to remove solids to leave cleaned water suitable for discharge or irrigation purposes; heavy metals, pathogens and organic chemicals of a potentially hazardous character often found in sewage will be removed for high temperature combustion whereby environmental contamination is obviated.

The physical interaction of steelworks dusts and sewage can be an effective relatively rapid process permitting capital-effective processing plants to be constructed.

An energy efficient process can be achieved utilising the energy values in the carbon contained in sewage sludge and metal of commercial value can be recovered in the smelting operation.

The smelting operation can provide for high temperature combustion permitting safe disposal in addition of numerous other waste products.

Embodiments of the invention will now be described by way of example only with reference to the accompanying drawings of which:

Figure 1:
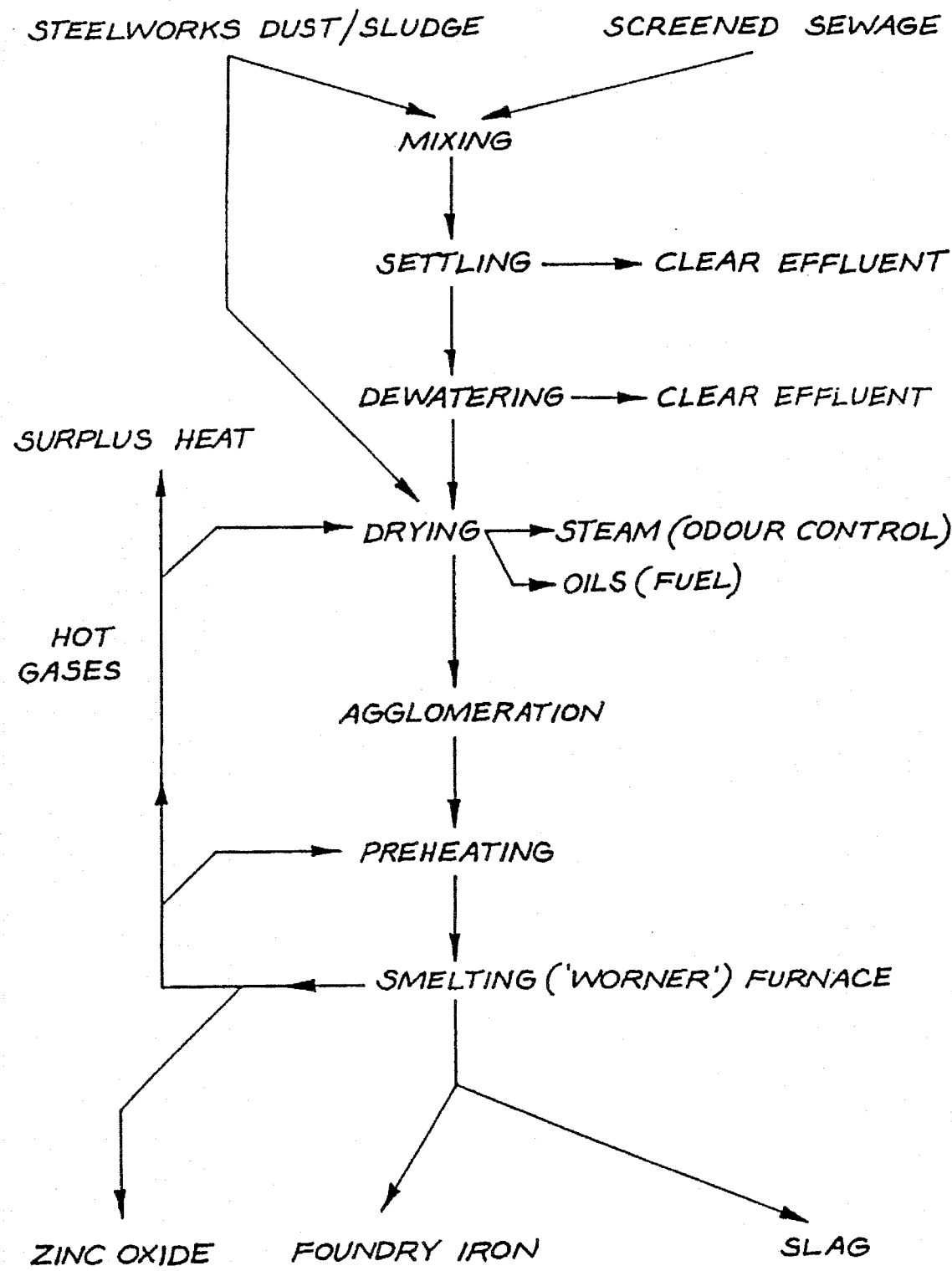
FIG. 1 is a flow chart illustrating a process embodying the invention.

FIG. 1 illustrates schematically a process applied to steelworks dusts and sewage. Screened sewage and steelworks dust are vigorously mixed and clear effluent results from a settling process. Dewatering e.g. by centrifuging takes place to give more clear effluent and a solid mass which is dried for example by the use of surplus heat from a later smelting process. A drying stage discharges steam and produces oils which may be used as a fuel or may have marketable value. The resultant solids are slightly damp and agglomeration, for example including briquetting, takes place to produce solid composites. The next step is drying and preheating step. An important economic factor is that surplus heat from off-gas from the smelting furnace is available for use in the drying and preheating step and thus an energy efficient process is available.

The solid composites are fed into the smelting furnace which yields molten iron which has market value as well as slag and the hot gas discharge contains zinc oxide which can be collected and also has market value.

Figure 2:
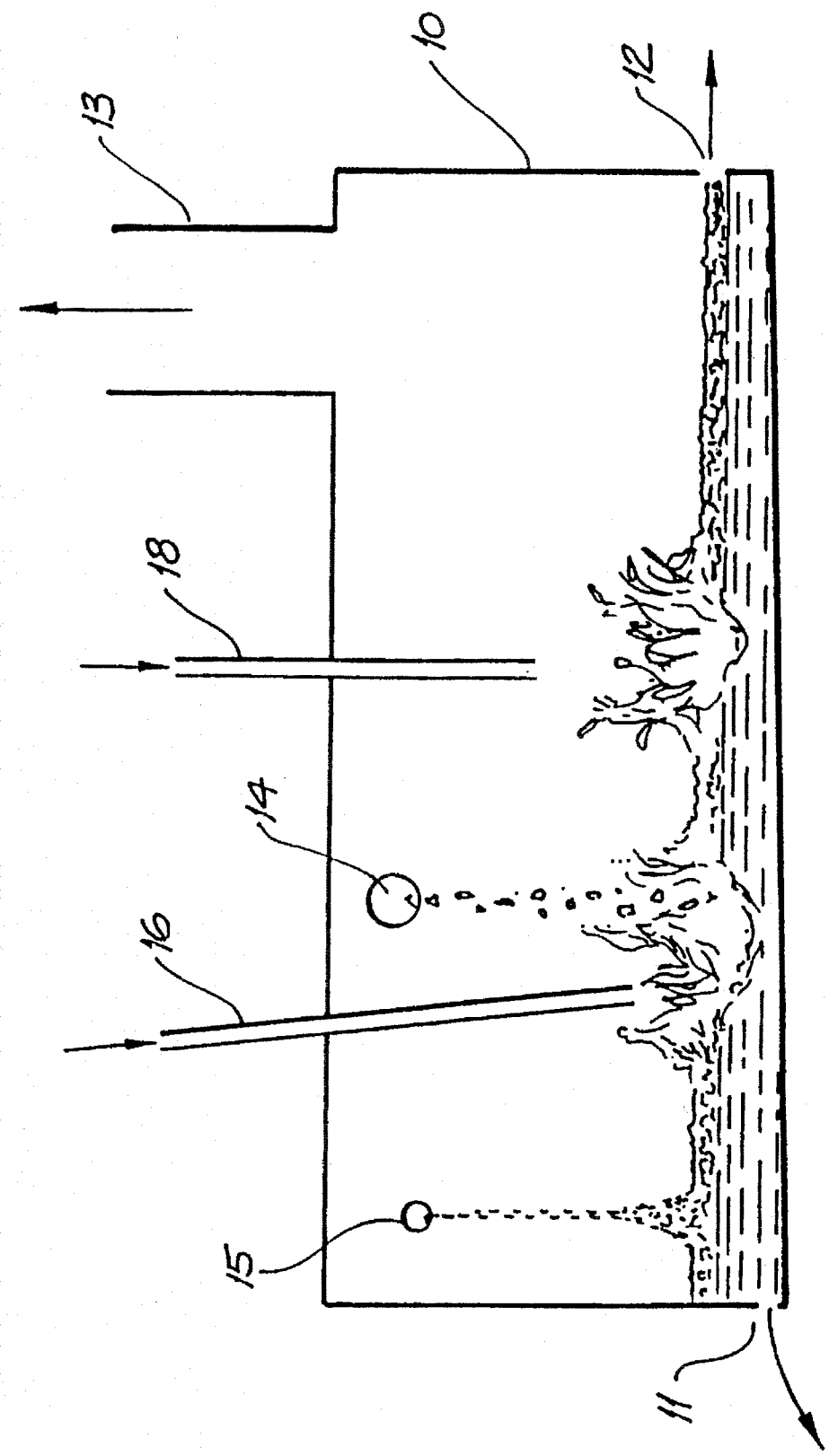
FIG. 2 is a schematic drawing of one embodiment of smelting furnace for use in the process.

Referring now to FIG. 2, the schematic drawing shows a barrel-shaped furnace which advantageously could be provided with a slight slope along the bottom towards a discharge point for molten foundry type iron. The furnace has a refractory lined body 10 with a molten iron tapping point 11 at the left hand end as shown and slightly above the refractory in the bottom of the barrel. At the right hand end is a slag tapping point 12. Above the right hand end is a hot gas discharge duct 13.

In the upper central region of the barrel but slightly offset towards the pig iron duct 11 is an inlet duct 14 for hot solid composites which fall into the bath. If the process requires the addition of extra burnt lime to aid the metal refining operation, then burnt lime is added through an inlet 15 above the left hand end region of the bath. The furnace of FIG. 2 operates as a counter-current furnace and vigorous turbulence within the bath is important to ensure effective operation. The lances 16 and 17 achieve this turbulence by introducing air or air enriched with oxygen in jets which vigorously agitate the central portion of the bath. The lance 18 nearer the hot gas discharge terminates at a higher level above the slag particularly for aiding post-combustion to the CO rich gas phase.

Figure 3:
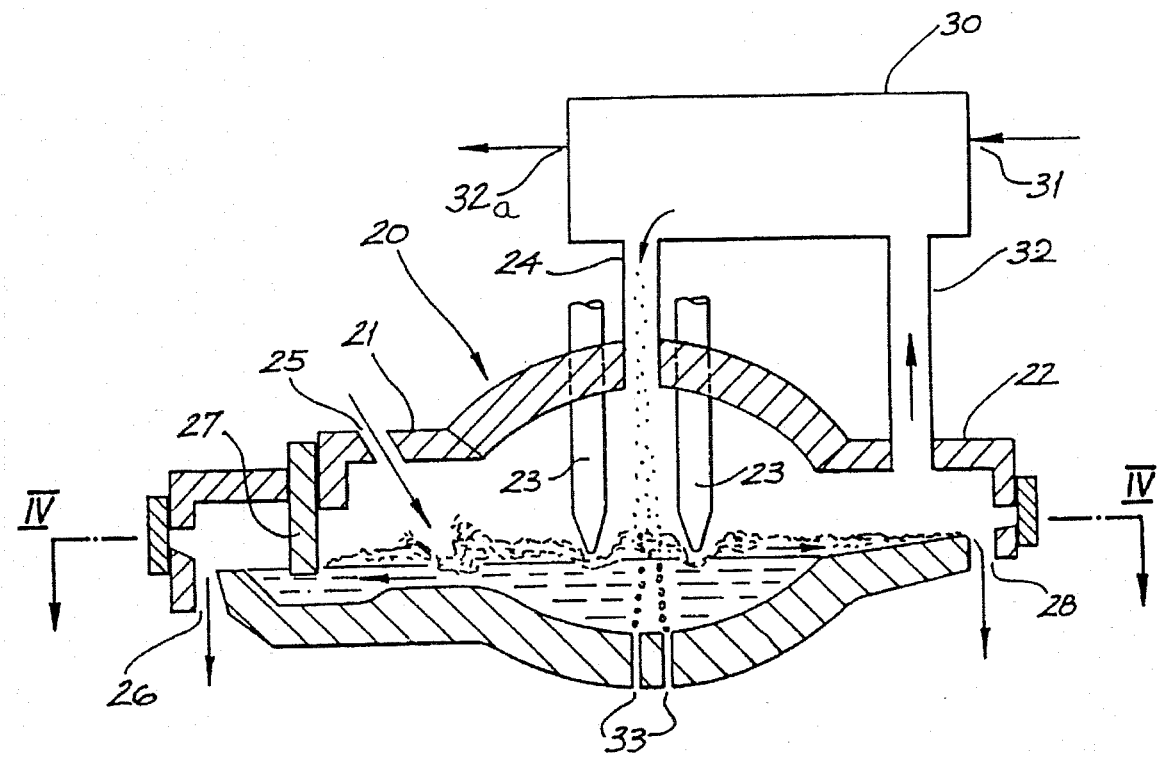
FIG. 3 is a cross-sectional, elevation view showing schematically a second embodiment of smelting furnace.
Figure 4:
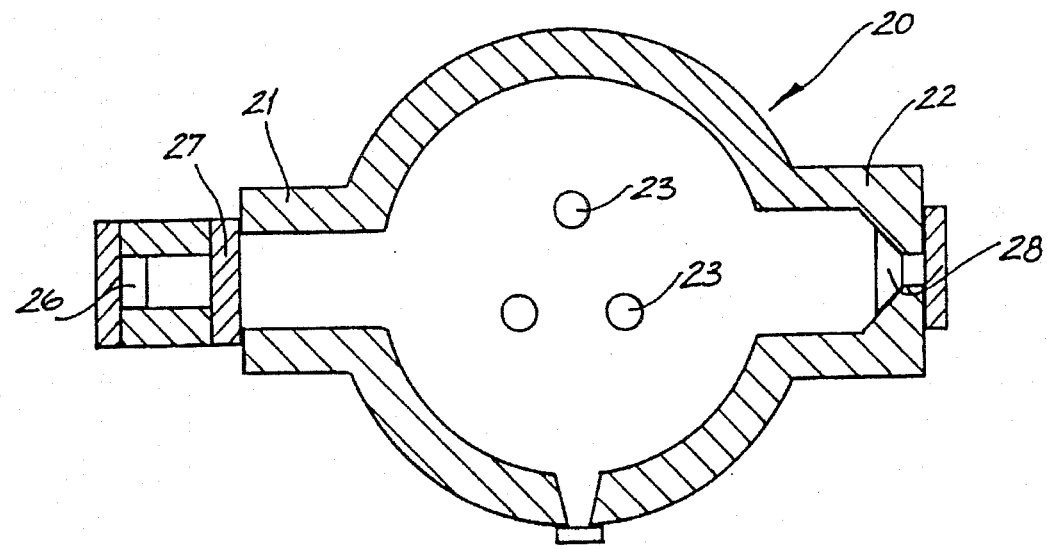
FIG. 4 is a sectional plan view of the furnace of FIG. 3 and taken along the line of IV–IV of FIG. 3.

Referring now to the embodiments in FIGS. 3 and 4, the furnace has a body portion 20 in its central region with first and second extensions 21 and 22 of general cylindrical form on opposite sides. A set of electrodes 23 extend centrally down into the bath for establishing an electric arc, the electrodes being adjacent and an inlet duct 24 for solid feed material. Centrally located in the bottom of the furnace of 20 is a set of gas injection jets 33 for admitting a mixing gas which is optional but can be applied to ensure vigorous turbulence of the molten bath.

The establishment of turbulence is aided by the application of an oxygen jet through an inlet 25 in the first extension 21, this inlet also being adapted to admit lime. It will be noted that a counter-current flow in the furnace occurs by virtue of the first extension 21 leading to a discharge duct 26 for iron, a weir 27 being provided to restrain flow of slag towards the iron discharge point. At the opposite side, the furnace has a higher discharge opening 28 for discharging molten slag.

As schematically shown above the furnace, a preheating apparatus 30 is provided, the apparatus having an inlet schematically shown at 31 for feeding horizontally solid feedstock material and adjacent thereto a hot gas inlet 32 from the furnace. This hot off-gas acts to preheat and to pre-reduce partially the solid material in the composites. The gas, at a lower temperature, is discharged through discharge 32a for further processing including removal of zinc and other metal values.

The equipment is operated so that temperatures in excess of 1300° C. (and preferably over 1420° C.) are achieved whereby any material entering the gaseous stage from the feedstock material capable of decomposition or combustion is so treated so that discharged hot gases will not contain any harmful materials such as organic chemicals. The feedstock material conveniently can be in briquette form or other essentially dustless form to facilitate handling. Since the solid material is immersed in the turbulent molten bath at around 1500° C., the resultant hot gases cannot contain harmful materials such as highly toxic organic compounds due to the combustion that occurs.

Examples illustrating use of a bath smelt reduction furnace as described above will now be given:

EXAMPLE I

Equal proportions by weight of haematite ore and finely ground lignite were mixed. The haematite ore comprised 64.5% Fe and the lignite, which contained carbon in relatively high reactivity form, initially contained 55% by weight water. The lignite was ground to a fine particulate form with particles ranging typically from 1 micron to 100 microns. The lignite thus formed a thick paste and was intimately mixed with the ground haematite ore.

As a flux calcium oxide (lime) was added to an amount equivalent to 5% by weight of the mixture of haematite and lignite and a source of low reactivity carbon natural graphite was added to an amount equal to 10% of the total weight of the mixture.

The mixture was extruded and chopped to form pellets of approximately 2 cm size which were air dried initially and further dried in a furnace at 120° C., conveniently using hot off-gases from the smelting step as a source of heat. The preheated pellets were then supplied to an electric furnace of the type described above with reference to FIGS. 2 and 3, a temperature of 1500° C. being maintained in the hot metal in the furnace.

It was found that cast iron of high quality and comprising about 4% carbon could be produced with an impurity content well within commercially acceptable limits.

The process can also be operated by including a proportion of other ferruginous material and other sources of carbonaceous material.

EXAMPLE II

As ferruginous material steelworks dust was used and intimately mixed with carbonaceous material comprising equal quantities by weight of natural graphite and biosolid derived from harvested weed from a lake. It was found that the lake weed provided carbonaceous material of a type which provided a natural binder and. After agglomeration the mass was briquetted to a size of about 2 cm transverse dimension.

Using an electric furnace of the type described above with reference to FIGS. 2 and 3, smelting took place at about 1500° C. and it was found that consistently high carbon values could be achieved in the cast iron. Carbon values up to 4.2% are possible but should higher carbon levels be required then increasing the operating temperature to 1600° could permit levels of 5% or more to be achieved using the low reactivity natural graphite.

EXAMPLE III

Example II was repeated but utilising, as a source of low reactivity carbon, comminuted scrap carbon electrodes from the aluminium industry. These carbon electrodes are seriously contaminated with environmentally harmful compounds which presents difficulty and expense in disposal due to the need to protect the environment. It was found that the source of carbon was suitable for inclusion in the process and harmful components decomposed at a high operating temperature. By using the countercurrent electric furnace of the type described above with reference to FIGS. 2 and 3 it was found that a high quality iron could be produced with the slag taking up components not wanted in the iron.

EXAMPLE IV

An example will now be given of a form of the invention applied to the treatment of a sewage stream with steelworks dust. Details given relate to a pilot plant experiment.

It will be appreciated that the composition of sewage varies from day to day at a particular plant and also varies between plants. Therefore adjustment of process conditions for optimisation will be necessary and the following details are just one example.

A screened sewage effluent comprising 265 ppm suspended solids and having a biological oxygen demand (BOD) of 270 was introduced into a continuous processing system at a rate of 100 liters per minute. Waste ferruginous steelworks dust and waste steelworks fine lime were vigorously mixed into the effluent stream so as to achieve in the stream 170 ppm of ferruginous dust and 100 ppm of lime kiln fines (calculated on a dry basis).

The steelworks dust contained 9–12% carbon in the form of coke fines and "Kish" graphite.

The effluent was allowed to flow into a second tank and at that point while maintaining the stirring, cationic flocculent was added to achieve an equivalent of 15 ppm in the flowing, dust-containing sewage. Conveniently the flocculent (commercially available Catoleum AA186H) was added as a conditioned liquid form flocculent. The flow passed into an elongated settling tank and it was found that rapid settling of flocculated material occurred, the liquid phase remaining in the range pH 6 to 7 for the process, and the experiment continuing over a period of 24 hours. The settled sludge mixture was found to have a pH of 11 and it was found that a 90% reduction of suspended solids in the sewage was achieved together with a reduction in the BOD value greater than 70%. Furthermore, for certain heavy metals in the sewage a reduction in the range 80 to 90% was achieved; in this case removal of most of the copper, cadmium and zinc content in the sewage was achieved. The sewage also contained trace amount of other heavy metals such as nickel, chromium and lead and significant removal of these trace amounts occurred.

At appropriate intervals, settled sludge was removed from the settling tank through a base off-take. The sludge was centrifuged to bring the water content to about 55% by weight, belt pressing was effected to reduce the water content to the range 30–35% and more steelworks dust in dry form was mixed thoroughly into the sludge mass to further reduce the moisture concentration and to raise the iron content on a dry basis to the range 45–50%.

Furthermore by appropriate blending, the carbon content of the solid mass was adjusted to ensure that there would be surplus carbon, in the order of 75%, over that theoretically required in the subsequent smelting step to reduce the iron and zinc oxidic materials in the dust. It is to be noted that as the steelworks dust contained between 9 and 12% carbon, and because the sewage component contained carbonaceous material, only minor adjustment of carbon content would normally be required. Furthermore, the steelworks dust and lime added in the settling stage provided ample calcium containing material to provide a basic slag in the subsequent smelting operation.

A mixer-extruder was used to form rods of damp sludge of approximately 25 mm diameter, these rods then being dried by a combination of solar drying and warming from hot off-gases from the smelting furnace, thereby providing a feed stock for the smelting furnace.

For the purpose of experiment, a batch-wise smelting operation was conducted in a barrel-shaped furnace lined with magnesite/dolomite basic bricks and rammed refractory. Heating was achieved by oxy-gas torches and lances and the process conditions were operated such that the metal bath was at a temperature in the range 1475° C. to 1525° C., with a slag layer generally being 20° to 50° C. hotter than the metal. The dry warm "rods" were fed into the furnace in a turbulent splash zone near a central oxy-gas lance. The slag phase was maintained with a (lime+magnesia):(silica+alumina) ratio of 2 or greater.

Experiments were conducted and it was found that where it was desired substantially to remove a phosphorus component in the iron melt, the oxygen ratio in a oxy-gas burner or jet located near the metal tapping end of the barrel-shaped furnace could be increased to provide a more oxidising slag.

It was found that the smelting operation consistently produced iron with greater than 4% carbon, silicon levels ranging from 0.1 to 0.6% and phosphorus levels between 0.01% and 0.05%, depending upon the degree of oxidation of the slag. Generally a sulphur content of less than 0.05% was achieved. All percentages are by weight.

The resultant slag was found to be similar to blast furnace slag and by using a simple condenser in the off-gas system, metal oxide was collected for analysis and found to have a zinc oxide content in the range 50 to 95%.

I claim:

1. A method of smelting in a continuous process, comprising intimately mixing ferrous material in particulate form with a mixture of a high reactivity carbonaceous material and a low reactivity carbonaceous material in particulate form, and wherein the low reactivity carbonaceous material is at least 5% by weight of the mixture forming a pelletised feedstock from an agglomeration of the ferrous material, the pelletised feedstock tolerating as minor components non-ferrous metal values, and carbonaceous material, said carbonaceous material having at least 5% by weight low reactivity form carbon, supplying the feedstock to an electric arc bath smelting furnace, with counter flow of slag and metal configured to operate in a counterflow of slag and metal fashion, and operating the furnace to maintain an iron bath temperature of at least about 1420° C. and to use the carbonaceous material to reduce iron compounds in the feedstock, to provide a source of fuel for maintaining the selected elevated temperature in the furnace and to carburise molten iron in the bath, and processing of gases from the reduction furnace to retrieve any metal values in the off-gas, the pelletized feedstock being supplied to the furnace in a controlled manner and the high reactivity form carbonaceous material in the pelletised feedstock being a sufficient proportion to maintain an iron bath temperature of at least about 1420° C. and the proportion of low reactivity carbonaceous material in the pelletised feedstock being sufficient to carburise the iron.

2. The method as claimed in claim 1 wherein the high reactivity form of carbon comprises sewage sludge.

3. The method as claimed in claim 1 wherein the low reactivity form of carbon is selected from the group consisting of coke fines, kish graphite from a steelworks, and mixtures thereof.

4. The method as claimed in claim 1 and wherein the high reactivity carbonaceous material includes material derived from biosolids.

5. The method as claimed in claim 1 and wherein the smelting is effected in a smelt reduction furnace of generally barrel-shaped form with a substantially horizontal axis and slag is continuously formed as a layer over the melt, the method including continuously tapping off the molten slag at a first location in the furnace and continuously tapping off the melt at a remote second location.

6. The method as claimed in claim 5 and wherein at least two lances are used to introduce air and/or oxygen for combustion in the form of jets, the jets being arranged to cause turbulence within the molten material.

7. The method as claimed in claim 6 and wherein one of said lances has a discharge substantially above the surface of the metal melt to aid combustion of carbon monoxide in the gases above the metal melt.

8. The method as claimed in claim 5 and wherein the furnace is an electric arc furnace having electrodes disposed for causing vigorous turbulence in the molten material and adjacent to a location for feed of the solid material.

9. The method as claimed in claim 1 and including intimately mixing lime with the ferrous material and carbonaceous material to provide a source of calcium for slag formation in the smelting stage.

10. A method of producing cast iron comprising the continuous process of taking particulate ferruginous materials, and carbonaceous materials formed into an intimate solid mixture in agglomerated form, the mixture having both a high reactivity carbonaceous material and a low reactivity carbonaceous material, and wherein the low reactivity carbonaceous material is at least 5% by weight of the mixture, the method tolerating as minor components non-ferrous metal values, and conducting an electric arc bath smelting operation in a furnace to produce cast iron, the method being characterised by (a) incorporating in the agglomerates carbonaceous material in suitable forms to provide a significant proportion of relatively low reactivity carbon to high reactivity carbon, the carbonaceous material being principally other than sewage sludge and the agglomerates including trace elements, contaminants, organic material, non-ferrous metallic components and (b) feeding the agglomerates into the furnace in a controlled manner whereby adequate carburising of the molten iron occurs from some of the carbonaceous material and other carbonaceous material burns as a fuel to maintain required high temperature processing conditions such that any organic compounds are destroyed and any other non-ferrous metal values are discharged through a flue and can be collected in a collection system.

11. The method as claimed in claim 10 and wherein at least a part of the high reactivity carbonaceous material is a biosolid other than sewage sludge and with the biosolid having binding characteristics to assist the formation of the agglomerated materials.

12. The method as claimed in claim 11 and wherein the agglomerated mixture comprises about 10%–50% by weight of carbonaceous material in low reactivity form.

13. The method as claimed in claim 10 and wherein the agglomerated material is formed into pellets of the order of 2 cm transverse dimension.

14. The method as claimed in claim 10 and wherein the ferruginous material is finely divided to have a particle size below 2 mm and the carbonaceous material is comminuted to a size being one or two orders of magnitude smaller than the ferruginous material.

15. A method as claimed in claim 10 and wherein the smelting is effected in an alternating current arc furnace or a direct current arc furnace.

16. The method as claimed in claim 10 and wherein the furnace is a counter-current bath smelting furnace operated continuously.

17. The method as claimed in claim 10 and wherein the low reactivity carbonaceous material includes natural graphite and/or coke fines.

18. A method as claimed in claim 10 and wherein controlling the smelting to maintain a temperature of about 1500° C. in molten iron.

19. The method as claimed in claim 10 and wherein the ferruginous material comprises haematite ore and the carbonaceous material comprises lignite or brown coal in micron sized particles and wherein the low reactivity material is a low reactivity graphite.

* * * * *